United States Patent [19]

Olson et al.

[11] Patent Number: 4,822,373

[45] Date of Patent: Apr. 18, 1989

[54] PROCESS FOR PROVIDING POLYAMIDE MATERIALS WITH STAIN RESISTANCE WITH SULFONATED NOVOLAK RESIN AND POLYMETHACRYLIC ACD

[75] Inventors: Maynard H. Olson, North St. Paul; John C. Chang, New Brighton; Imelda A. Muggli, St. Paul, all of Minn.

[73] Assignee: Minnesota Mining and Manufacturing Company, St. Paul, Minn.

[21] Appl. No.: 167,041

[22] Filed: Mar. 11, 1988

[51] Int. Cl.$^4$ .............................. C14C 9/00; B32B 7/00
[52] U.S. Cl. ................................ 8/115.6; 8/115.54; 252/8.57; 252/8.6; 252/8.8; 428/96; 428/267
[58] Field of Search ............................ 8/115.6, 115.54; 252/8.6, 8.8; 428/267

[56] References Cited

U.S. PATENT DOCUMENTS

| | | | |
|---|---|---|---|
| 2,205,883 | 6/1938 | Graves | 149/5 |
| 3,408,319 | 12/1964 | Rau | 260/23 |
| 3,961,881 | 7/1974 | Sumner et al. | 8/17 |
| 3,994,744 | 10/1974 | Anderle et al. | 134/4 |
| 4,081,383 | 9/1976 | Warburton, Jr. et al. | 252/8.6 |
| 4,203,859 | 4/1978 | Kirn et al. | 252/174.23 |
| 4,334,876 | 8/1980 | Beier et al. | 8/94.19 |
| 4,388,372 | 3/1982 | Champaneria et al. | 428/395 |
| 4,501,591 | 6/1984 | Ucci et al. | 8/495 |
| 4,526,581 | 2/1983 | Prentiss et al. | 8/94.33 |
| 4,579,762 | 6/1985 | Ucci | 428/95 |
| 4,592,940 | 8/1985 | Blythe et al. | 428/96 |
| 4,699,812 | 11/1986 | Munk et al. | 427/393.4 |

FOREIGN PATENT DOCUMENTS

| | | | |
|---|---|---|---|
| 0235980 | 2/1987 | European Pat. Off. | 15/41 |
| 0235989 | 2/1987 | European Pat. Off. | 15/41 |

OTHER PUBLICATIONS

*Sulfonated and Related Reactions,* E. E. Gilbert, Interscience *Phenolic Resins,* A Knopf et al., Springer-Verlag, 1985.

*Primary Examiner*—A. Lionel Clingman
*Attorney, Agent, or Firm*—D. M. Sell; W. N. Kirn; Truesdale C.

[57] ABSTRACT

A treated fibrous polyamide substrate having resistance to staining by acid colorants is provided. The treated substrate comprises a fibrous polyamide substrate having applied thereto (a) a partially sulfonated novolak resin and (b) polymethacrylic acid, copolymers of methacrylic acid, or combinations of said polymethacrylic acid and said copolymers of methacrylic acid.

16 Claims, 1 Drawing Sheet

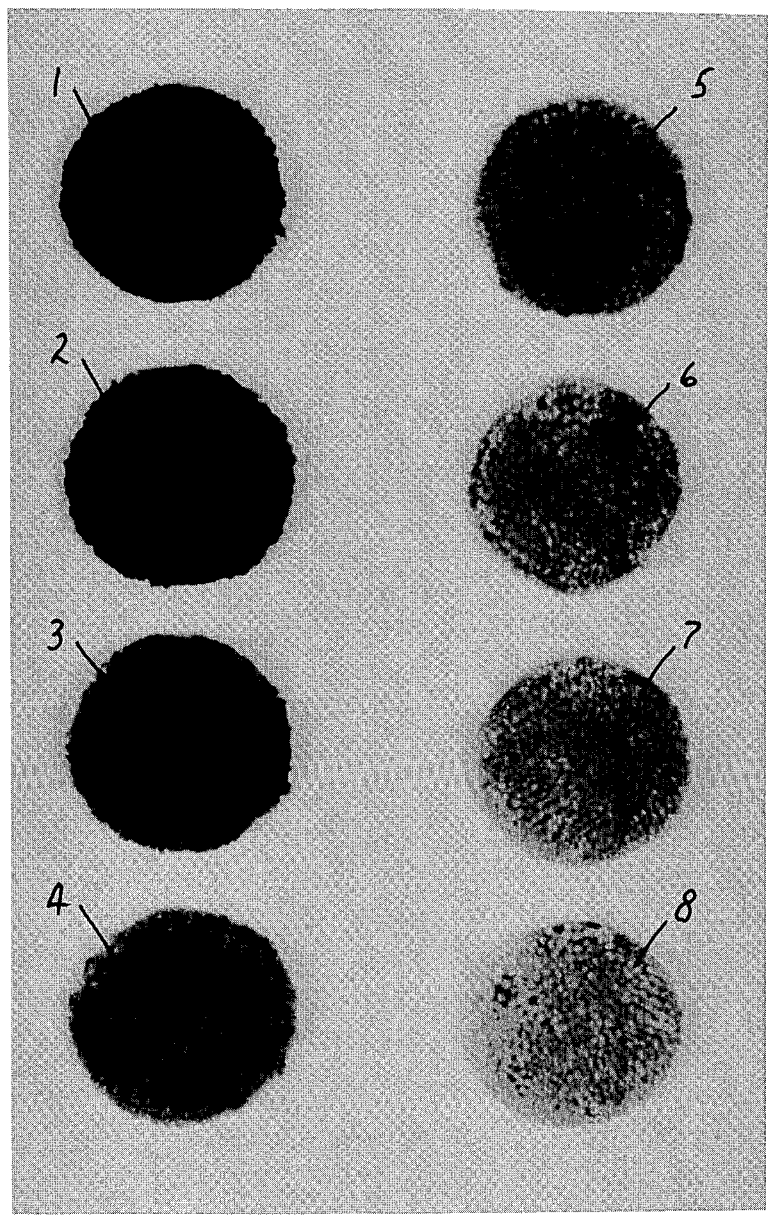

PROCESS FOR PROVIDING POLYAMIDE MATERIALS WITH STAIN RESISTANCE WITH SULFONATED NOVOLAK RESIN AND POLYMETHACRYLIC ACID

This invention relates to a process for providing fibrous polyamide materials such as nylon carpet with stain resistance and polyamide materials as treated.

Fibrous polyamide articles such as nylon carpets are particularly susceptible to staining by natural and artificial acid colorants such as are commonly found in many foods and beverages. A need has long been felt for processes for economically providing such fibrous polyamide articles with resistance to staining by acid colorants. Particularly desirable are processes by which durable stain resistance can be imparted to fibrous polyamide articles during conventional processing and treating operations.

U.S. Pat. No. 4,501,591 (Ucci et al.) discloses a process for providing stain resistant polyamide carpets in which a sulfonated phenol-formaldehyde condensation product and an alkali metal silicate are added to the dye liquor in a continuous dyeing process, followed by steaming, washing, and drying the carpet.

U.S. Pat. No 4,592,940 (Blyth et al.) discloses a process for imparting stain resistance to nylon carpet by immersing the carpet in a boiling aqueous solution of a selected phenol-formaldehyde condensation product at a pH of 4.5 or less. The process is carried out in conventional beck dyeing apparatus subsequent to dyeing (generally at a pH of 6.5 to 8.0) by either acidifying the bath to 4.5 or draining the dye bath and replacing the dye bath with a corresponding amount of water adjusted to pH 4.5 or less.

U.S. Pat. No. 4,579,762 (Ucci) discloses stain resistant nylon carpet in which the nylon fibers are made from a polymer modified to contain, as an integral part of its polymer chain, sufficient aromatic sulfonate units to improve the acid dye resistance of the fibers and in which the backing adhesive contains a fluorochemical in an amount sufficient to render the backing a barrier to liquids.

European Patent Publication No. 0 235 980 (DuPont) discloses a synthetic polyamide textile substrate having deposited thereon a modified polymeric sulfonated phenol-formaldehyde condensation product comprising one (a) in which 10 to 25% of the polymer units contain $SO_3^{(-)}$ radicals and about 90 to 75% of the polymer units contain sulfone radicals and (b) in which a portion of the free hydroxyl groups thereof has been acylated or etherified, the number of the hydroxyl groups which have been acylated or etherified being sufficient to inhibit yellowing of said condensation product but insufficient to reduce materially the capacity of the condensation product to impart stain resistance to the synthetic polyamide textile substrate.

European Patent Publication No. 0 235 989 (DuPont) discloses a method for producing stain resistant polyamide fibers. The fibers are made stain resistant by treating them with a sulfonated naphthol- or sulfonated phenol-formaldehyde condensation product. Applying the stain-resist compounds at pH values of between 1.5 and 2.5 renders them stable to yellowing upon exposure to agents in the environment such as $NO_2$.

U.S. Pat. No. 3,961,881 (Sumner et al.) discloses a process for coloring synthetic polyamide textile materials which comprises applying to the textile materials by a dyeing, padding or printing process, an aqueous dispersion of pH less than 7 of a disperse dyestuff containing at least one carboxylic acid group and in the presence of a tanning agent, whereby level colorations are obtained which have excellent wet fastness properties. As set forth by Sumner et al., examples of natural agents include tannic acid and the vegetable tannins, while synthetic agents include condensation products of naphthols, naphthalene sulphonic acids and formaldehyde, condensation products of phenol, naphthalene, formaldehyde and sulphuric acid, condensation products of dihydroxydiphenylsulphone and formaldehyde, condensation products of dihydroxydiphenylsulphone sulphonic and aliphatic aldehydes, condensation products of sulphurized phenols, naphthalene and formaldehyde.

U.S. Pat. No.2,205,883 (Graves) discloses tanning agents which are the acidic polymerization products of the polymerization of methacrylic acid with itself as well as interpolymerization of methacrylic acid with other materials.

U.S. Pat. No. 3,408,319 (Rau) discloses tanning compositions which are made by copolymerization of a mixture of (A) methacrylic acid, acrylic acid or mixtures of such acids with (B) a sulfated unsaturated oil. The unsaturated acid used is preferably 75 to 100% methacrylic acid and 25 to 0% respectively of acrylic acid, and generally the use of methacrylic acid exclusively is most practical from the standpoint of cost and effectiveness. The amount of sulfonated oil is from 10 to 25% by weight of the acid monomer.

U.S. Pat. No. 3,994,744 (Anderle et al.) discloses aqueous cleaning compositions having a minimum film-forming temperature of at least 30° C. and comprising a polymer having a glass transition temperature of at least 35° C. and a metal salt, form a tacky film after being applied to a soiled substrate. Soil adheres to the tacky film which, as a result of the drying of said composition, fractures to form a removable residue. The compositions contain polymers preferably derived from a carboxylic acid monomer and a soft monomer and/or a hard monomer. Preferred soft monomers are vinyl acetate and the alkyl esters of acrylic acid wherein the alkyl group contains from 1-12 carbon atoms. Suitable hard monomers include lower alkyl methacrylates wherein the lower alkyl group contains 1-3 carbon atoms, cycloalkyl acrylates and methacrylates wherein the cycloalkyl group contains 5-7 carbon atoms, and hard vinyl monomers. Examples of acid monomer include acrylic, methacrylic, itaconic, maleic and crotonic acids and monoalkyl esters of itaconic and maleic acids wherein the alkyl group contains 1-8 carbon atoms.

U.S. Pat. No. 4,081,383 (Warburton, Jr. et al.) discloses an anti-soiling treatment for carpets and carpet yarns. The carpets or carpet yarns prior to carpet manufacture are coated with a polymeric material containing either (A) a blend of a methacrylic acid emulsion copolymer and an epoxy resin or (B) a methacrylic acid emulsion copolymer having epoxy monomer units therein. The copolymer in either case contains 40–75% by weight methacrylic acid and the glass transition temperature of cured coatings of the polymeric material is at least 50° C.

U.S. Pat. No. 4,334,876 (Beier et al.) discloses a process for producing leather wherein leather stock is subjected to a multiple-stage tanning process involving a first treatment with an aqueous dispersion or solution of a least one member selected from the group consisting of acrylic acid and methacrylic acid and, optionally, one or more polymerizable compounds selected from the group of alkyl esters of acrylic acid, alkyl esters of methacrylic acid and sulfated unsaturated drying oils, followed by a second treatment with a zirconium tanning compound having a 0–45% basicity by the Schorlemmer scale.

U.S. Pat. No. 4,388,372 (Champaneria et al.) discloses a durable antisoiling coating composition for textile filaments comprising a perfluoroalkyl ester of a citric acid urethane and fluorinated alcohols in combination with a modified epoxy resin which is the reaction product of a carboxyl-functional vinyl polymers an epoxy resin and a tertiary amine. Preferred vinyl resins for use in making the modified epoxy resin reaction product are the terpolymers of styrene/ethyl acrylate/methacrylic acid, and particularly such terpolymers wherein the monomers are in a mol ratio to one another respectively of about 1:1:2.

U.S. Pat. No. 4,526,581 (Prentiss et al.) discloses a process for producing leather which employs a copolymer tanning agent comprising at least 60 mole percent residues of methacrylic acid and at least about 5 mole percent of residues of at least one alkyl acrylate selected from methyl, ethyl, propyl, and butyl acrylates, the copolymer having a weight average molecular weight from about 3,500 to 9,000.

U.S Pat. No. 4,699,812 (Munk et al.) discloses a method for imparting stain resistance to fibers containing free amino groups, and especially polyamide fibers, by contacting the fiber with a solution of an aliphatic sulfonic acid containing 8 to 24 carbon atoms under acidic conditions.

The present invention, in one aspect, provides fibrous polyamide substrates, such as nylon carpet, having resistance to staining by acid colorants comprising fibrous polyamide substrate having applied thereto (a) a partially sulfonated novolak resin and (b) polymethacrylic acid, copolymers of methacrylic acid, or combinations of said polymethacrylic acid and said copolymers of methacrylic acid. Surprisingly, the application of both materials can provide excellent stain resistance to acid colorants without yellowing on exposure of the polyamide substrate to ultraviolet light, as is often seen when the partially sulfonated novolak resin is used alone. Further, application of both materials can provide improved stain resistance to acid colorants. Generally, a rating of at least 5 is satisfactory, a rating of 7 is good, and a rating of 8 is excellent when the treated substrate is tested according to the test method set forth hereinafter which test method challenges the substrate with an aqueous solution of FS&C Red Dye No. 40, a common stain test solution.

The present invention, in another aspect, provides a method for imparting to fibrous polyamide materials stain resistance to acid colorants comprising contacting the fibrous polyamide materials with an aqueous treating solution comprising (a) a partially sulfonated novolak resin and (b) polymethacrylic acid, copolymers of methacrylic acid, or combinations of said polymethacrylic acid and said copolymers of methacrylic acid. Alternatively, the fibrous polyamide substrate can be contacted sequentially with an aqueous treating solution of the partially sulfonated novolak resin and an aqueous treating solution of the polymethacrylic acid, copolymers of methacrylic acid, or combinations thereof, the order of to treatment not being critical.

The present invention, in a further aspect, provides an aqueous solution useful in imparting stain resistance to acid colorants to fibrous polyamide materials, the solution comprising a mixture of (a) a partially sulfonated novolak resin and (b) polymethacrylic acid, copolymers of methacrylic acid, or combinations thereof.

The file of this patent contains at least one drawing executed in color. Copies of this patent with color drawing(s) will be provided by the Patent and Trademark Office upon request and payment of the necessary fee.

The FIG. shows a photograph of a graduated rating scale which ranges from 1 to 8 used for evaluating carpet samples tested for stain resistance according to the test method set forth hereinafter. In the rating scale, 1 represents no discernible removal of red dye stain and 8 represents complete removal of dye stain.

The sulfonated novolak resins useful as component (a) in this invention include known substances such as those compositions which are condensation products of formaldehyde with bis(hydroxyphenyl)sulfone and phenylsulfonic acid. Instead of, or in addition to, formaldehyde, another aldehyde such as, for example, acetaldehyde, furfuraldehyde, or benzaldehyde, can be used to make the condensation product. Also, other phenolic compounds such as, for example, bis(hydroxyphenyl)alkane, e.g., 2,2-bis(hydroxyphenyl)propane, and bis(hydroxyphenyl)ether compounds can be used instead of, or in addition to, the bis(hydroxyphenyl)sulfone. The sulfonated novolak resin is partially sulfonated, i.e., has a sulfonic acid equivalent weight of about 300–1200, preferably 400–900. Examples of such resins are disclosed in U.S. Pat. No. 4,592,940 (Blyth et al.) which is incorporated herein by reference for this purpose. Also commercially available sulfonated novolak products are available such ,as FX-369, a stain release product available from 3M Company, Intratex ™ N, available from Crompton and Knowles Corp., Erional ™ PA, available from Ciba-Geigy Corp., Nylofixan ™ P, available from Sandoz, Ltd., Mesitol ™ NBS, available from Mobay Chemical Corp., Resist #4, available from Lyndal Chemical Co., Ameriolate ™, available from American Emulsions Co., Inc., and Synthabond ™ 1938, available from Piedmont Chemical Industries. Sulfonation of phenolic compounds is taught, for example, in *Sulfonated and Related Reactions*, E. E. Gilbert, Interscience Publishers, 1965. Condensation of phenol-formaldehyde resins is taught, for example, in *Phenolic Resins*, A Knopf et al., Springer-Verlag, 1985.

Component (b) useful in the present invention is polymethacrylic acid, copolymers of methacrylic acid, or combinations thereof and preferably is hydrophilic. As used herein, the term "methacrylic polymer", is intended to include the polymethacrylic acid homopolymer as well as polymers formed from methacrylic acid and one or more other monomers. The monomers useful for copolymerization with the methacrylic acid are monomers having ethylenic unsaturation. Such monomers include, for example, monocarboxylic acids, polycarboxylic acids, and anhydrides; substituted and unsubstituted esters and amides of carboxylic acids and anhydrides; nitriles; vinyl monomers; vinylidene monomers; monoolefinic and polyolefinic monomers; and heterocyclic monomers.

Representative monomers include, for example, acrylic acid, itaconic acid, citraconic acid, aconitic acid, maleic acid, maleic anhydride, fumaric acid, crotonic acid, cinnamic acid, oleic acid, palmitic acid, vinyl sulfonic acid, vinyl phosphonic acid, alkyl or cycloalkyl esters of the foregoing acids, the alkyl or cycloalkyl groups having 1 to 18 carbon atoms such as, for example, ethyl, butyl, 2-ethylhexyl, octadecyl, 2-sulfoethyl, acetoxyethyl, cyanoethyl, hydroxyethyl and hydroxypropyl acrylates and methacrylates, and amides of the foregoing acids, such as, for example, acrylamide, methacrylamide, methylolacrylamide, and 1,1-dimethylsulfoethylacrylamide, acrylonitrile, methacrylonitrile, styrene, α-methystyrene, p-hydroxystyrene, chlorostyrene, sulfostyrene, vinyl alcohol, N-vinyl pyrrolidone, vinyl acetate, vinyl chloride, vinyl ethers, vinyl sulfides, vinyl toluene, butadiene, isoprene, chloroprene, ethylene, isobutylene, vinylidene chloride, sulfated castor oil, sulfates sperm oil, sulfated soybean oil, and sulfonated dehydrated castor oil. Particularly useful monomers include, for example, ethyl acrylate, itaconic acid, sodium sulfostyrene, and sulfated castor oil. Of course, mixtures of the monomers can be copolymerized with the methacrylic acid.

The methacrylic polymers useful in the present invention can be prepared using methods well-known in the art for polymerization of ethyleneically unsaturated monomers.

Preferably, the methacrylic acid comprises about 30 to 100 weight percent, more preferably 60 to 90 weight percent, of the methacrylic polymer. The optimum proportion of methacrylic acid in the polymer is dependent on the comonomer(s) used, the molecular weight of the copolymer, and the pH at which the material is applied. When water-insoluble comonomers, such as ethyl acrylate, are copolymerized with the methacrylic acid, they may comprise up to about 40 weight percent of the methacrylic polymers. When water-soluble monomers, such as acrylic acid or sulfoethyl acrylate are copolymerized with the methacrylic acid, the water-soluble comonomers preferably comprise no more than 30 weight percent of the methacrylic polymer and preferably the methacrylic polymer also comprises up to about 50 weight percent water-insoluble monomer.

Generally, the methacrylic polymer should be sufficiently water-soluble that uniform application and penetration of the polymer into the fiber surface can be achieved. However, when the polymer is excessively water soluble, acid colorant stain resistance and durability to cleaning may be reduced.

The glass transition temperature of the copolymer can be as low as about 35° C. although high glass transition temperatures are preferred. When polymer having high glass transition temperatures, i.e., as high as 230° C. or higher, are used, an additional benefit of improved soil resistance of the fibrous polyamide substrate can be obtained.

The weight average molecular weight and the number average molecular weight of the methacrylic polymer should be such that satisfactory stain resistance is provided by the polymer. Generally, the lower 90 weight percent of the polymer material preferably has a weight average molecular weight in the range of about 3000 to 100,000. Generally, the lower 90 weight percent of the polymer material preferably has a number average molecular weight in the range of about 500 to 20,000, more preferably in the range of about 800 to 10,000. Generally, more water-soluble comonomers are preferred when the molecular weight of the polymer is high and less water-soluble or water-insoluble comonomers are preferred when the molecular weight of the polymer is low.

Commercially available methacrylic polymers generally useful in the present invention include Leukotan TM 970, Leukotan TM 1027, Leukotan TM 1028, and Leukotan TM QR 1083, available from Rohm and Haas Company.

The amounts of the sulfonated novolak resin and the methacrylic polymers used should be sufficient to provide the desired degree of stain resistance to the polyamide substrate. Generally, when the substrate is nylon 66, lower application levels can be used than when the substrate is nylon 6 or wool. When the polyamide material is heat-set carpet yarn, yarn heat-set under moist conditions, e.g., in an autoclave, generally requires higher application levels than yarn heat-set under substantially dry conditions. Preferably, the amount of sulfonated novolak resin used is at least about 0.01 weight percent, more preferably at least about 0.02 weight percent, most preferably at least about 0.0% weight percent, based on the weight of the fiber (owf) when treating nylon 66 carpet fiber. Generally, amounts of sulfonated novolak resin in excess of about 0.08 weight percent owf provides little added benefit. Preferably, the amount of methacrylic polymer used is at least about 0.06 weight percent, more preferably at least about 0.125 weight percent, most preferably at least about 0.25 weight percent, based on the weight of the fiber when treating nylon 66 carpet fiber. Generally, amounts of methacrylic polymer in excess of 0.5 weight percent owf provide little added benefit. Preferably, the amount of sulfonated novolak resin used is at least about 0.02 weight percent, more preferably at least about 0.04 weight percent, based on the weight of the fiber when treating nylon 6 carpet fiber. Preferably, the amount of methacrylic polymer used is at least about 0.125 more, preferably at least about 0.25 weight percent, based on the weight of the fiber when treating nylon 6 carpet fiber.

Generally, the sulfonated novolak resin and the methacrylic polymer are applied from aqueous solutions. The pH of the solution is preferably below about 7, more preferably below about 5.

The sulfonated novolak resin and the methacrylic polymer can be applied from an aqueous exhaust bath such as is used in beck dyeing of carpet. The sulfonated novolak resin and the methacrylic polymer can be added to the aqueous dye bath solution and exhausted concurrently with the dye. Generally, the dye bath is maintained at a temperature at or near the boiling point for a period of 10 to 90 minutes or more to effect exhaustion of the dye, the sulfonated novolak resin, and the methacrylic polymer.

Alternatively, the mixture of the sulfonated novolak resin and the methacrylic polymer can be added to the aqueous dye bath after exhaustion of the dye or the dye bath can be drained and fresh water added prior to the addition of the sulfonated novolak resin and the methacrylic polymer. Generally, the bath is maintained at a temperature at or near boiling for a period of time sufficient to exhaust the sulfonated novolak resin and the methacrylic polymer, usually 10 to 90 minutes.

Additionally, the sulfonated novolak resin and the methacrylic polymer can be applied sequentially from separate baths, if desired, the order of application not being critical.

The sulfonated novolak resin and methacrylic polymer can be applied during continuous dyeing, such as with Kuster or Otting TM carpet dyeing equipment. The sulfonated novolak resin and the methacrylic polymer can be added directly to the aqueous dye solution and the solution is conventionally applied to the polyamide carpet. Alternatively, the sulfonated novolak resin and the methacrylic polymer can be applied during a wetting out step prior to application of the dye.

The sulfonated novolak resin and the methacrylic polymer can also be applied to polyamide material by a padding operation. This can be done as a separate step or in conjunction with the application of various convention finishes such as wetting agents, softeners, and leveling agents. After application of the solution, the polyamide material is conventionally dried.

The mixture of the sulfonated novolak resin and the methacrylic polymer can also be applied by foam techniques which are well-known in the art. Generally, the mixture of the sulfonated novolak resin and the methacrylic polymer are applied from an aqueous solution which further can contain a foaming agent. The foaming agents used are those typically used in foam dyeing.

The sulfonated novolak resin and the methacrylic polymer can also be applied to polyamide fabrics by other methods well known to those skilled in the art. Other suitable methods include application by padding, low-pressure padding such as can be accomplished with Kuster Flexnip TM equipment, spray applicators such as those available from Otting International, or dip boxes which need not be equipped with moisture reduction apparatus such as squeeze rolls. The sulfonated novolak resin and the methacrylic polymer is generally applied in these methods from an aqueous solution at ambient conditions followed by steaming for from 15 to 180 seconds, when drying or from an aqueous solution at elevated temperatures, e.g., 60° C. to 90° C., followed by skying for 15 to 18% seconds, then drying.

The mixture of the sulfonated novolak resin and the methacrylic polymer can also be applied to nylon carpet during carpet shampooing. Useful techniques include the use of scrubbing machines and steam or hot water cleaning machines.

Fluorochemical compositions for providing oil and water repellency can also be applied in conjunction with the sulfonated novolak resin and the methacrylic polymer. The fluorochemical composition is simply added in an appropriate amount to the treating solution.

The following non-limiting examples serve to illustrate the invention. In the following examples, all ratios are by weight and percentages are weight percent unless otherwise indicated.

In the examples, the following staining test was used: Ten ml of an aqueous solution containing 0.008 weight percent FD&C Red Dye No. 40 and 0.04 weight percent citric acid is poured onto a 12.5 cm × 12.5 cm test sample of carpet, which was dyed with a blue disperse dye in a 45 minute beck dyeing cycle, forming a stain about 5 cm in diameter. The solution is pressed into the sample using the rounded end of a 1.75 cm diameter test tube. The solution is allowed to remain on the test sample for eight hours at room temperature, i.e., about 22° C. The sample is rinsed under running tap water, dried, and when evaluated for staining using a graduated rating scale which ranges from 1 to 8, as shown in the drawing, where 1 represents no discernible removal of the red dye stain and 8 represents complete removal of the red dye stain. In general, an eight-hour stain resistance of at least about 5 is satisfactory, at least about 7 is good, and 8 is excellent.

The weight average molecular weight (Mw) and the number average molecular weight (Mn) of the lower 90 weight percent of several commercially available methacrylic acid-based copolymers, Leukotan TM 970, Leukotan TM 1027, Leukotan TM 1028, and Leukotan TM QR 1083, all available from Rohm and Haas Co., were determined using a column bank having four Ultrahydrogel columns, i.e., linear, 1000, 500, and 250, available from American Polymer Standards Company. The results were as follows:

| Copolymer | Mw | Mn |
|---|---|---|
| Leukotan TM 970 | 6,360 | 2,320 |
| Leukotan TM 1027 | 9,020 | 2,910 |
| Leukotan TM 1028 | 9,460 | 5,592 |
| Leukotan TM QR 1083 | 5,280 | 1,410 |

In the examples, discoloration due to exposure of the treated sample to ultraviolet light is determined using AATCC Test Method 16E-1978 with an exposure time of 40 hours. The exposed sample is evaluated for yellowing using a graduated rating scale which ranges from 1 to 5, with a rating of 5 representing no yellowing. In general, a rating of at least 4 is satisfactory, at least 4.5 is excellent.

EXAMPLE 1 AND COMPARATIVE EXAMPLE C1

In Example 1, into a bath containing 0.3 g Leukotan TM 970, an aqueous solution of a methacrylic acid-based copolymer containing about 33 weight percent copolymer, available from Rohm and Haas Co., in 300 g water with the pH adjusted to 3.4 with acetic acid was placed a 10 g sample of nylon 66 carpet. The temperature of the bath was raised to the boil and maintained at the boil for 30 minutes with agitation. The sample was removed from the bath, rinsed, and placed in a fresh bath containing 0.1 g FX-369, a sulfonated novolak resin provided as an aqueous solution containing about b 33.weight percent resin, available from 3M Company, and 0.2 g magnesium sulfate in 300 g water. The temperature of the bath was raised to the boil and maintained at the boil for 30 minutes with agitation. The sample was rinsed and dried at 130° C. for 10 minutes.

In Comparative Example C1, a 10 g sample was placed in a bath containing 0.1 g FX-369 and 0.2 g magnesium sulfate in 300 g water. The temperature of the bath was raised to the boil and maintained at the boil for 30 minutes with agitation. The sample was rinsed and dried at 130° C. for 10 minutes.

Each sample was tested for initial stain resistance (SR), stain resistance after cleaning with a Steamex TM cleaner, available from U.S. Floor Systems, Inc., using 1 oz/gal Steamex TM detergent and a temperature of 140° F. (SR-C), and for UV discoloration (UV-D). The results are set forth in Table 1.

TABLE 1

| Example | SR | SR-C | UV-D |
|---|---|---|---|
| 1 | 8 | 8 | 4.5 |
| C1 | 7 | 6 | 4.0 |

As can be seen from the results in Table 1, the treatment of the carpet with the methacrylic acid-based comonomer, Leukotan TM 970, together with a sulfonated novolak resin, FX-369, improves the stain resistance before and after cleaning and reduces discoloration after exposure to UV light.

EXAMPLE 2 AND COMPARATIVE EXAMPLE C2

In Example 2, a solution containing 1 g/l sequestering agent, 1 g/l wetting agent, 1 g/l leveling agent, 0.1 g/l dye, 2.5 g/l FX-369, 10 g/l Leukotan TM 970, and 2 g/l magnesium sulfate with the pH adjusted to 5.5 with acetic acid was applied to a nylon 66carpet sample at a rate of 400 weight percent wet pickup to simulate a continuous dyeing process. The sample was steamed for 5 minutes and dried at 130° C. for 10 minutes.

In Comparative Example C2, a nylon carpet sample was treated as in Example 2 except that the Leukotan TM 970 was omitted from the treating solution.

Each sample was tested for stain resistance and UV discoloration. The results are set forth in Table 2.

TABLE 2

| Example | SR | UV-D |
|---|---|---|
| 2 | 7.5 | 5 |
| C2 | 6.5 | 4 |

As can be seen from the results in Table 2, the treatment of the carpet with the methacrylic acid copolymer, Leukotan TM 970, together with a sulfonated novolak resin, FX-369, improves the stain resistance and reduces discoloration after exposure to UV light.

EXAMPLE 3 AND COMPARATIVE EXAMPLE C3

In Example 3, a 10 g sample of nylon 66 carpet was placed in a bath containing 0.05 g FX-369 and 0.3 g Leukotan TM 970 in 300 g water with the pH adjusted to 3.4 with acetic acid. The bath temperature was raised to the boil and maintained at the boil for 60 minutes with agitation. The sample was removed from the bath rinsed and dried at 130° C. for 10 minutes In Comparative Example C3, a sample of nylon 66 carpet was treated as in Example 3 except that the Leukotan TM 970 was omitted from the bath.

The samples were tested for stain resistance. The results are set forth in Table 3.

TABLE 3

| Example | SR |
|---|---|
| 3 | 7 |
| C3 | 5 |

As can be seen from the data in Table 3, the treatment of the carpet with the methacrylic acid-based polymer, Leukotan TM 970, together with a sulfonated novolak resin, FX-369, improves the stain resistance.

EXAMPLE 4

A sample of nylon 6 carpet, produced from yarn heatset under moist conditions, was treated following the procedure of Example 1. The sample was tested for stain resistance and received a rating of 7+, indicating good stain resistance.

Examples 5-7 and Comparative Example C4-C10

In Example 5, a solution containing 12.5 g/l FX-369, 75 g/l Leukotan TM 970, and 10 g/l Alkafoam TM D, a foaming agent available from Alkaril Chemicals, Inc., was prepared and foamed onto a sample of nylon 6 carpet using a Gaston County laboratory FFT model foam finishing machine, available from Gaston County Dyeing Machine Company, using a 60:1 blow ratio and a wet pickup rate of 20% to provide an application rate of 1.5% owf Leukotan TM 970 and 0.25% owf FX-369. The sample was dried at 25° F. for 20 minutes.

In Examples 6 and 7, samples of nylon 6 carpet were treated as in Example 5 except that the application rates were reduced to the amounts set forth in Table 4.

In Comparative, Examples C4, C6, and C8, samples of nylon 6 carpet were treated as in Examples 5-7, respectively, except that the Leukotan TM 970 was omitted from the bath and the FX-369 was applied at the rate set forth in Table 4. In Comparative Examples C5, C7, and C9, samples of nylon 6 carpet were treated as in Examples 5-7, respectively, except that the FX-369 was omitted from the bath and the Leukotan TM 970 was applied at the rate set forth in Table 4. In Comparative Example C10, the nylon 6 carpet was untreated.

Each sample was rated for stain resistance (SR) and for ultraviolet light discoloration (UV-D). The results are set forth in Table 4.

TABLE 4

| Example | FX-369 (% owf) | Leukotan 970 (% owf) | SR | UV-D |
|---|---|---|---|---|
| 5 | 0.25% | 1.5% | 7.5 | 4.5 |
| C4 | 1.75% | 0 | 6.5 | 2 |
| C5 | 0 | 1.75% | 6 | 4.5 |
| 6 | 0.125% | 0.75% | 7 | 4 |
| C6 | 0.875% | 0 | 6 | 2.5 |
| C7 | 0 | 0.875% | 4 | 4 |
| 7 | 0.062% | 0.375% | 6.5 | 4 |
| C8 | 0.438% | 0 | 4 | 3 |
| C9 | 0 | 0.438% | 3.5 | 4 |
| C10 | 0 | 0 | 1 | 4.5 |

As can be seen from the data in Table 4, the application of the methacrylic acid .opolymer, Leukotan TM 970, and the FX-369 even at levels as low -s 0.375% owf Leukotan TM 970 and 0.063% owf FX-369(Example 7) provides satisfactory stain resistance. Further, the application of only the FX-369 showed excessive ultraviolet light discoloration as well as reduced stain resistance as compared to the application of both FX-369 and Leukotan TM 970.

Examples 8-11 and Comparative Examples C11-18

In Example 8, a solution containing 12.5 g/l FX-369, 75 g/l Leukotan TM 970, and 10g/l Ajkafoam D, was prepared and foamed onto a sample of nylon 66 carpet using a Gaston County laboratory FFT model foam finishing machine, using a 60:1 blow ratio and a wet pickup rate of 20% to provide an application rate of 1.5% owf Leukotan TM 970 and 0.25% owf FX-369. The sample was dried at 250° F, for 20 minutes.

In Examples 9, 10, and 11, samples of nylon 66 carpet were treated as in Example 8 except that the application rates were reduced to the amounts set forth in Table 5.

In Comparative Examples C11, C13, C15, and C17, samples of nylon 66 carpet were treated as in Examples 9-11, respectively, except that the Leukotan TM 970 was omitted from the bath, and FX-369 was applied at the rate set forth in Table 5. In Comparative Examples C12, C14, C16, and C18, samles of nylon 66 carpet were treated as in Examples 9-11, respectively, except that the FX-369 was omitted from the bath and the Leukotan TM 970 was applied at the rate set forthiin Table 5.

Each sample was rated for stain resistance and resistance to ultraviolet light discoloration. The results are set forth in Table 5.

TABLE 5

| Example | FX-369 (% owf) | Leukotan 970 (% owf) | SR | UV-D |
|---|---|---|---|---|
| 8 | 0.25% | 1.5% | 8 | 4.5 |
| C11 | 1.75% | 0 | 8 | 2 |
| C12 | 0 | 1.75% | 7.5 | 4.5 |
| 9 | 0.125% | 0.75% | 8 | 4.5 |
| C13 | 0.875% | 0 | 8 | 3 |
| C14 | 0 | 0.875% | 7 | 4.5 |
| 10 | 0.062% | 0.375% | 7.5 | 4.5 |
| C15 | 0.438% | 0 | 8 | 3.5 |
| C16 | 0 | 0.438% | 7 | 4.5 |
| 11 | 0.031% | 0.188% | 7 | 4.5 |
| C17 | 0.219% | 0 | 7.5 | 4.5 |
| C18 | 0 | 0.219% | 6 | 4.5 |

As can be seen from the data in Table 5, excellent stain resistance as well as lack of ultraviolet light discoloration can only be achieved, at the levels tested, with the use of both the Leukotan TM 970 and the FX-369 (Examples 10 and 11).

Examples 12-17

In Examples 12, 13, and 14, samples of nylon 6 carpet were treated and tested for stain resistance as in Example 5 except that Leukotan TM 1027, Leukotan TM 1028, and Leukotan TM QR 1083, respectively, were substituted for the Leukotan TM 970. The results are set forth in Table 6. In Examples 15, 16 and 17 samples of nylon 66 carpet were treated and tested as in Example 11 except that Leukotan TM 1027, Leukotan TM 1028, and Leukotan TM QR 1083, respectively, were substituted for the Leukotan TM 970. The results are set forth in Table 6.

TABLE 6

| Example | Nylon fiber type | Leukotan TM designation | SR |
|---|---|---|---|
| 12 | 6 | 1027 | 7.5 |
| 13 | 6 | 1028 | 5.5 |
| 14 | 6 | QR 1083 | 2.5 |
| 15 | 66 | 1027 | 8 |
| 16 | 66 | 1028 | 8 |
| 17 | 66 | QR 1083 | 8 |

As can be seen from the data in Table 6, Leukotan TM 1027, Leukotan TM 1028, and Leukotan TM QR 1083 in combination with FX-369 provide excellent stain resistance on nylon 66 carpet fiber. However, Leukotan TM 1027 provides good stain resistance, Leukotan TM 1028 provides only satisfactory stain resistance, and Leukotan TM QR 1083 provides little stain resistance in combination with FX-369 on the more difficult to treat nylon 6 carpet fiber at the level of application rate used, i.e. 0.25 weight percent FX-369 owf and 1.5 weight percent Leukotan TM owf The various modifications and alterations of this invention will be apparent to those skilled in the art without departing from the scope and spirit of this invention and this invention should not be restricted to that set forth herein for illustrative purposes

What is claimed is:

1. A treated fibrous polyamide substrate having resistance to staining by acid colorants comprising a fibrous polyamide substrate having applied thereto (a) a partially sulfonated novolak resin and (b) polymethacrylic acid, copolymers of methacrylic acid, or combinations of said polymethacrylic acid and said copolymers of methacrylic acid.

2. The treated substrate of claim 1 wherein said sulfonated novolak resin comprises a sulfonated condensation product of at least one phenolic compound and an aldehyde.

3. The treated substrate of claim 2 wherein said phenolic compound is a bis(hydroxyphenyl) sulfone and said aldehyde is formaldehyde or acetaldehyde.

4. The treated substrate of claim 1 wherein (b) is polymethacrylic acid.

5. The treated substrate of claim 1 wherein copolymer is a copolymer of methacrylic acid and a comonomer which is a monocarboxylic acid, a polycarboxylic acid, an anhydride, a substituted or unsubstituted ester or amide of a carboxylic acid or anhydride, a nitrile, a vinyl monomer, a vinylidene monomer, a monoolefinic or polyolefinic monomer, a heterocyclic monomer, or combinations thereof.

6. The treated substrate of claim 5 wherein said comonomer is alkyl acrylate having 1 to 4 alkyl carbon atoms, itaconic acid, sodium sulfostyrene, or sulfated castor oil.

7. The treated substrate of claim 5 wherein said copolymer is a terpolymer of methacrylic acid, sodium sulfostyrene, and styrene; methacrylic acid, sulfated castor oil, and acrylic acid; or methacrylic acid, acrylic acid, and sulfated castor oil.

8. The treated substrate of claim 1 wherein methacrylic acid comprises about 30 to 100 weight percent of said copolymer of methacrylic acid.

9. The treated substrate of claim 1 wherein the lower 90 weight percent of said polymethacrylic acid and said copolymers of methacrylic acid have a weight average molecular weight in the range of about 2500 to 250,000.

10. The treated substrate of claim 1 wherein the lower 90 weight percent of said polymethacrylic acid and said copolymers of methacrylic acid have a number average molecular weight in the range of about 500 to 20,000.

11. The treated substrate of claim 1 wherein said substrate is nylon 66 and said sulfonated novolak resin is present in an amount of about at least 0.01 weight percent and said polymethacrylic acid or said copolymers of methacrylic acid are present in an amount of at least about 0.06 weight percent based on the weight of the polyamide fibrous substrate.

12. The treated substrate of claim 1 wherein said substrate is nylon 6 and said sulfonated novolak resin is present in an amount of at least 0.03 weight percent and polymethacrylic acid or said copolymers of methacrylic acid are present in an amount of at least 0.125 weight percent based on the weight of the polyamide fibrous substrate.

13. The treated substrate of claim 1 wherein said treated substrate has a stain resistance rating of at least 5.

14. A method for imparting to fibrous polyamide materials stain resistance to acid colorants comprising contacting the fibrous polyamide materials with an aqueous treating solution comprising (a) a partially sulfonated novolak resin and (b) polymethacrylic acid, copolymers of methacrylic acid, or combinations of said polymethacrylic acid and said copolymers of methacrylic acid.

15. A method for imparting to fibrous polyamide materials stain resistance to acid colorants comprising contacting the fibrous polyamide materials sequentially contacting said fibrous polyamide materials with an aqueous treating solution of a partially sulfonated novolak resin and an aqueous treating solution of a polymethacrylic acid, copolymers of methacrylic acid, or combinations thereof.

16. An aqueous solution useful in imparting stain resistance to acid colorants to fibrous polyamide materials, the solution comprising a mixture of (a) a partially sulfonated novolak resin and (b) polymethacrylic acid, copolymers of methacrylic acid, or combinations of said polymethacrylic acid and said copolymers of methacrylic acid.

* * * * *

UNITED STATES PATENT AND TRADEMARK OFFICE
CERTIFICATE OF CORRECTION

PATENT NO. : 4,822,373

DATED : APRIL 18, 1989

INVENTOR(S) : MAYNARD H. OLSON, et al.

Page 1 of 2

It is certified that error appears in the above-identified patent and that said Letters Patent is hereby corrected as shown below:

Title page, Item (54) and
Col. 1, line 5, "ACD" should be --ACID--.
Col. 2, line 66, insert --synthetic polymeric composition made by polymerizing at-- after "or solution of a".
Col. 3, line 12, "polymers" should be --polymer,--.
Col. 3, line 66, delete "to" after "order of".
Col. 4, line 33, delete comma after "such".
Col. 6, line 15, "0.0%" should be --0.04--.
Col. 7, line 29, "when" should be --then--.
Col. 8, line 38, "b33." should be --33--.
Col. 9, line 8, "66carpet" should be --66 carpet--.
Col. 10, line 3, "25°F" should be --250°F--.
Col. 10, line 37, ".opolymer" should be --copolymer--.
Col. 10, line 38, "-s" should be --as--.
Col. 10, line 49, "Ajkafoam" should be --Alkafoam--.

UNITED STATES PATENT AND TRADEMARK OFFICE
CERTIFICATE OF CORRECTION

PATENT NO. : 4,822,373
DATED : APRIL 18, 1989
INVENTOR(S) : MAYNARD H. OLSON, et al.

It is certified that error appears in the above-identified patent and that said Letters Patent is hereby corrected as shown below:

Col. 10, line 65, "samles" should be --samples--.
Col. 11, line 31, new paragraph after "Table 6.".
Col. 12, line 38, delete hyphen after copolymers.
Col. 12, line 50, insert --said-- before polymethacrylic acid.

Signed and Sealed this

Second Day of January, 1990

*Attest:*

JEFFREY M. SAMUELS

*Attesting Officer*     *Acting Commissioner of Patents and Trademarks*